United States Patent Office 2,968,874
Patented Jan. 24, 1961

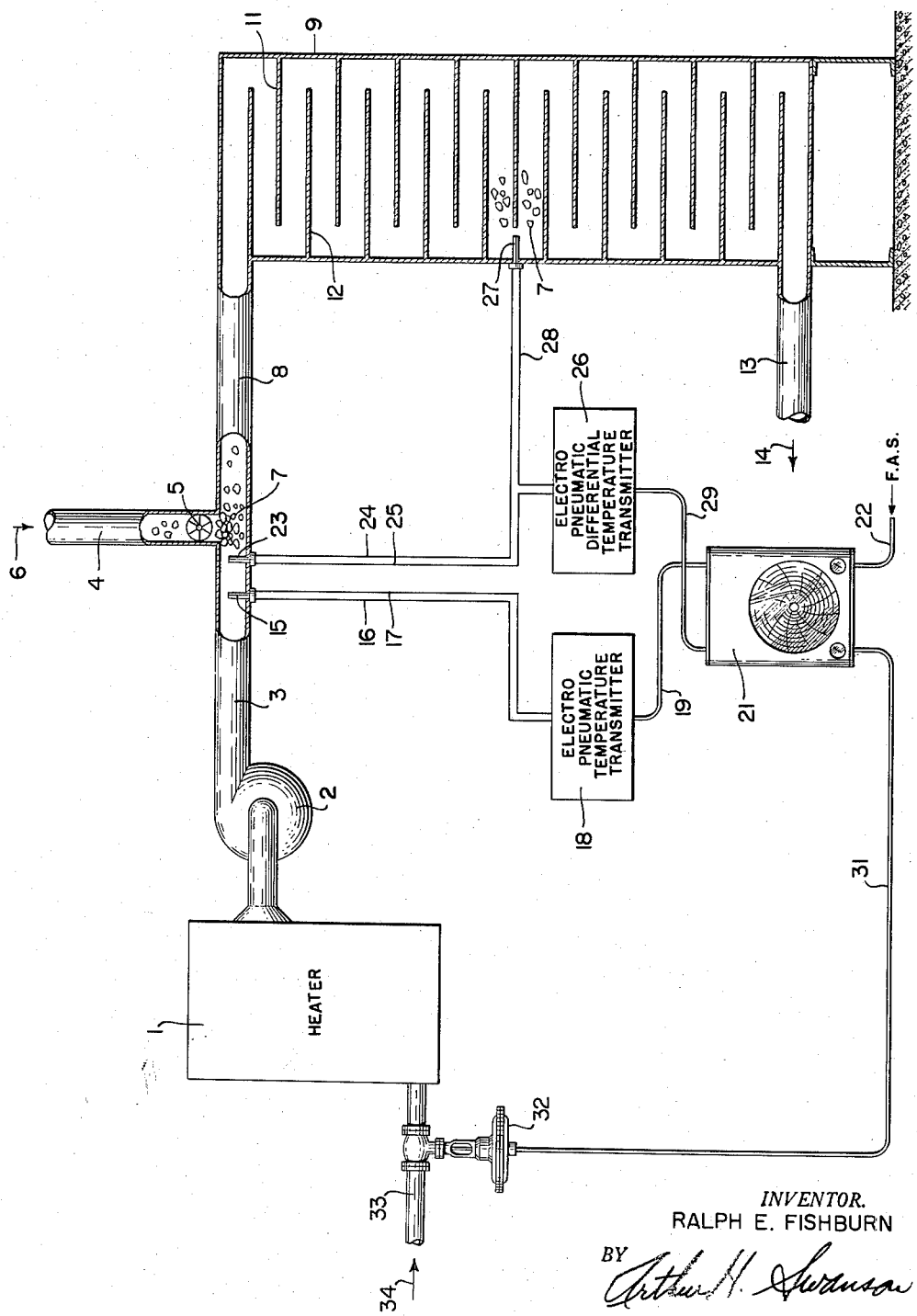

2,968,874

TEMPERATURE CONTROL APPARATUS FOR COTTON DRIERS

Ralph E. Fishburn, Oreland, Pa., assignor to Minneapolis-Honeywell Regulator Company, Minneapolis, Minn., a corporation of Delaware Filed Mar. 26, 1957, Ser. No. 648,601

3 Claims. (Cl. 34—48)

A general object of the present invention is to provide an automatically operated control apparatus of the electropneumatic type which will control the operation of an air heater and a blower unit attached thereto. More specifically, the present invention is concerned with an automatic control apparatus that senses the temperature of a stream of heated air that is being transmitted to a moist material being fed into the top of a drying tower and senses the temperature of a portion of the stream of material as it travels through a mid-portion of the tower and then effects a control action that will regulate the temperature and heat content, of the heated air that a heater blower unit delivers to such a stream of moist material in accordance with the aforementioned sensed temperature differences.

The present invention has particular utility for drying material such as mechanically or hand picked cotton as it is received from the cotton bins or wagons and which include trash contents, for example, particles of field earth, leaves, sticks, weeds, and other debris that has become mixed with the cotton. It has been found that if the moisture retained by the fibers of such raw cotton that is to be cleaned is too great, it will pack and mat up against circular saw blades as the raw cotton fiber is torn away from its associated seed, during the ginning operation that follows the aforementioned drying operation. On the other hand, it has also been found that if too much moisture has been removed from such raw cotton or, in other words, if there is an excessive amount of drying of the cotton fibers, the subsequent ginning of this type of cottton will produce an undesirable over-dried, poor colored short fiber or brittle cotton.

It is therefore another object of the present invention to provide a control apparatus for this raw material heating and drying purpose that will automatically regulate the temperature and heat content of heated air that is delivered by an air heater and blower unit to a level that will produce a raw material having a uniform moisture content so that it will neither be difficult to gin nor be a raw material of the undesirable short brittle fiber type.

To this end, the control apparatus disclosed in this application makes use of an inferential measurement that is based on the principle that the temperature difference between two temperature sensing elements located some distance apart along the path of travel of a heated air supply being forced into and through a material drying unit will be a function of the quantity and moisture content of the material that is being forced through the unit by the stream of heated air. As the quantity of moisture content of this raw material increases the temperature differences existing between the two temperature sensing elements will likewise increase. It is therefore another specific object of the present invention to provide a control apparatus that will maintain the aforementioned uniform moisture content of a material leaving a drying unit, e.g., a drying tower by regulating an air heater and blower unit in such a manner that the temperature of the air entering the tower is increased as the moisture content and/or quantity of the entering material is increased.

It is also another specific object of the present invention to provide a control apparatus which will maintain the material leaving the tower at a uniform moisture content level by controlling the air heater and blower unit in such a way that the temperature of the material entering the aforementioned drying tower will be decreased as the moisture content and/or quantity of the material entering the tower decreases.

A better understanding of the present invention may be had from the following detailed description when read in connection with the accompanying drawing.

Referring to the single figure, there is shown an electropneumatic automatic operated control apparatus which is particularly adapted for use in production of raw cotton of a uniform moisture content by cotton ginners. While the explanation that follows will be in connection with a control apparatus that is well adapted to produce a raw cotton of a uniform moisture content, it is to be understood that such a control apparatus can also be useful in producing uniform moisture content for many other types of raw materials dried in this manner.

The drawing shows the cotton drying operation referred to supra being accomplished by an air heater 1 and blower unit 2 having a duct 3 for passage of hot air therethrough. Normal to and opening into the duct 3 there is shown a second duct 4. Within this duct 4 there is schematically shown a vacuum feeder 5 which is used to transport raw or seed cotton flowing in the direction of the arrow 6 into the right end of the duct 3.

This raw cotton material is transported to the duct 4 by way of a cyclone separator, not shown in the drawing, that in turn receives this cotton from either storage bins or wagons that have brought the cotton to the mill to be ginned. This cotton 7 is shown travelling in the direction of the arrow 6 past the vacuum feeder 5 to the duct portion 8 that forms an extended right end part of the duct 3. The duct 8 is shown opening into a drying tower 9 having a plurality of drying shelves, e.g., 11 and 12 that protrude outward from the sides of the tower to form a zigzag passageway therethrough through which the cotton may pass. The lower portion of the drying tower 9 has a duct 13 connected thereto through which a cotton of a desired uniform moisture content is permitted to pass in the direction of the arrow 14. This duct is used as a vehicle to transfer the dry cotton to a cotton gin stand, not shown.

The electro-pneumatic automatic operated control apparatus that is used to produce a predetermined moisture content in the cotton leaving the bottom of the tower 9 is comprised of a pencil type thermocouple 15. This thermocouple 15 is shown protruding into the duct 3 at a location preceding the point where the heated air from blower 2 is being brought into contact with the flowing stream of cotton 7. Connected to this thermocouple 15 there is shown extension leads 16 and 17. The other end of these leads 16 and 17 are connected to a transmitter 18 which may be in a form of the non-indicating electronic pneumatic temperature transmitter. The device consists of a self-balancing potentiometer portion of the type disclosed in the Wills Patent 2,423,540, filed December 1, 1941 and issued July 8, 1947 which adjusts a pneumatic transmitter portion of the type disclosed in the Moore Patent 2,311,853, filed November 5, 1937 and issued February 23, 1943 so that the transmitter portion is operative to deliver an output air pressure signal which is a function of the temperature sensed by the thermocouple.

Since the components of this transmitter are described in detail in the aforementioned patents, no further description of the internal construction of them is deemed to be necessary.

The aforementioned air pressure output signal from the transmitter 18 is transmitted through the conduit 19 to a temperature controller 21 with a pneumatically adjusted control index which may be of a type disclosed in the Burdick Patent 2,548,943, filed August 2, 1946 and issued April 17, 1951 and which has connected thereto a filtered air supply line 22.

This cotton drying control apparatus also consists of a second pencil type thermocouple 23 that is schematically shown protruding into the duct 3 adjacent the thermocouple 15. This thermocouple 23 is also positioned at a spot in the duct 3 immediately preceding the point where the heated air from the blower 2 is being brought into contact with the stream of flowing cotton 7. Connected to this thermocouple 23 there is shown a pair of extension leads 24, 25. The other ends of these leads 24, 25 are shown connected respectively to a second transmitter 26 and a third thermocouple 27. This third pencil type thermocouple 27 is shown protruding through a mid-portion of the drying tower 9 and into the path of the cotton 7 that is being blown through the tower 9 from its top duct 8 to its bottom outlet duct 13. Connected to this third thermocouple 27 there is also shown an extension lead 28. The leads 24, 25, and 28 are shown connected so that the electromotive forces that the thermocouples develop oppose each other. The electromotive force thus developed across the terminals of the leads 24, 28, that are connected to the top of the transmitter 26 will be sent as an electrical input signal into the transmitter 26 and this signal will be proportional to the difference between the temperature sensed by the second thermocouple 23 and the third thermocouple 27. The transmitter 26 may therefore be the same type of non-indicating electro-pneumatic temperature transmitter as that set forth under the description of the transmitter 18 noted supra.

An air pressure signal is transmitted from the transmitter 26 by way of the conduit 29 as a control point signal to the temperature controller 21. This temperature controller 21 in turn is shown transmitting an output pressure control signal through the conduit 31 to a heater regulator means, for example, the control valve 32 shown controlling the fuel being fed through a fuel supply conduit 33 into the heater 1. Although not shown in the drawing one may obviously substitute for the air heater shown any conventional electrical type of heater whose heat output can be regulated by the magnitude of the pressure signal flowing through the conduit 31.

From the above description of the control apparatus it can readily be seen that if the quantity of cotton and/or the moisture content of the cotton forced into the duct 8 by the vacuum feeder 45 is increased, the temperature being sensed by the third thermocouple 27 in the tower will decrease if the flow of heated air from the heater to the blower 1, 2 remains constant.

When such an increase in the quantity and/or the moisture content of the cotton flowing into the duct 8 occurs the constant amount of heated air that the heater-blower unit 1, 2 is then supplying will not be of the sufficient amount to evaporate the moisture from the cotton into the air surrounding the cotton as thoroughly as it had dried it before the increase in quantity and/or moisture content of the cotton took place. For this reason it is evident that constant heated air supply apparatus that have heretofore been used for such a drying purpose do not provide a satisfactory means for producing air dried cotton of a uniform moisture content.

The operation of the control mechanism disclosed in this application, the operation of which is to be hereinafter described, does, however, provide an apparatus that will produce cotton of uniform moisture content regardless of whether the quantity and/or moisture content of the cotton flowing into a drying tower inlet duct 8 increases, decreases, or remains constant.

Whenever the incoming flow of heated air from the heater-blower unit 1, 2 flowing into the duct 8 is increased or decreased, the temperature sensed by the thermocouple 15 will likewise be increased or decreased. The thermocouple 15 will then send such a change in the form of an electrical signal through its extension leads 16, 17 to the transmitter 18. In response to the change in signal sent to it by the thermocouple and its associated leads the transmitter 18 will alter the output pressure signal that it is transmitting through the conduit 19 to the temperature controller 21 to a pressure that is a function of the aforementioned air temperature increase or decrease that has been sensed by the thermocouple 15.

The extension leads 24, 25, of thermocouple 23 and lead 28 of a second thermocouple 27 also is used to sense the aforementioned changes in the heated air entering the duct 8 and the third thermocouple 27 extending into the tower 9 that is used to sense increases in the temperature of the cotton are combined to send an electrical signal into the transmitter 26 that is proportional to the change in temperature difference that is occurring between the two latter mentioned thermocouples. In response to the change in signals sent to it by the two thermocouples 23, 27 and their associated leads, the transmitter 26, in turn, will alter the output control point fluid pressure adjusting signal that it is transmitting through the conduit 29 to the temperature controller 21 to a value that is a function of the change in temperature difference that has occurred between the temperature sensed by thermocouples 23 and that sensed by thermocouple 27.

It can thus be seen that during the aforementioned change in temperature difference occurring between thermocouples 23 and 27 any alteration in the automatically adjusted control point setting of the controller 21 such as that described supra will be a function of the temperature difference occurring between thermocouple 23 and 27.

The purpose for which the controller 21 disclosed in the aforementioned Burdick Patent 2,548,943 is used in the present application is to provide an instrument in which variations in a first condition, or differences in temperature of the heated air entering the duct 8 and the temperature of the cotton medium as sensed by the thermocouple 27, may be used to adjust the control point at which a second condition or the temperature of the heated air entering duct 8, can be regulated. To this end, a control pressure signal is thus transmitted by the controller 21 through conduit 31 to the control valve 32. When the aforementioned change in temperature difference occurs between thermocouples 23 and 27 so as to permit the control valve 32 to be moved towards its open positon, the degree to which this control valve will be opened in this manner will depend on the extent of the temperature difference that exists between the temperature being sensed by the thermocouple 23 and thermocouple 27. Opening of valve 32 in this way will permit a greater amount of fuel to flow through the conduits 33 in the direction of the arrows 34 into the heater 1. This increase in flow of fuel will permit the heater 1 to produce heated air at a higher temperature for the blower 2 to force in through the ducts 3 and 8. When this heated air at this higher temperature is blown into the cotton it will more uniformly dry out a greater percentage of the moisture in the cotton flowing in the ducts 8.

Whenever the incoming flow of heated air from the heater blower unit flowing into the duct 8 is increased or decreased the temperature being sensed by the first and second thermocouples 15 and 23 will likewise be increased or decreased. This increase or decrease in temperature will in turn be transmitted, in a manner similar to that already described, by extension leads 16, 17, from thermocouple 15 to the transmitter 18 which will in turn send out a signal that is a function of this increase or decrease in temperature to the controller 21. The extension leads 24, 25, 28 of the second thermocouple 23 that are used to sense the aforementioned changes in the warm air entering the duct 8 and the third thermocouple 27 that is used to sense decreases in the temperature of the cotton are combined to send an electrical signal that is proportional to the temperature difference occurring between the two latter mentioned thermocouples to the transmitter 26 in a manner similar to that previously described. The output control point fluid pressure adjusting signal of the transmitter 26 in turn will alter the signal that it is sending to the controller 21 through conduit 29 to a value that is a function of the increase in temperature difference that has occurred between the temperatures sensed by thermocouples 23, 37. The controller 21 will, in turn, send a control pressure signal through the conduit 31 to the control valve 32 when the aforementioned increase in temperature differential occurs between thermocouples 23 and 27 so as to permit the control valve 32 to be rapidly moved toward a closed position in a manner similar to but in the reverse manner of that described under the opening operation of this valve 32. This control action will result in a reduction in the amount of fuel being transmitted to the heater 1. This in turn will reduce the temperature and heat content of heated air that the heater 1 is feeding by way of the blower 2 to the ducts 3 and 8. When this reduction in the supply of warm air being blown into the temperature and heat content of the cotton occurs this heated air will then not have an opportunity to remove too much of the moisture from the cotton and will thus prevent over drying of the cotton which will produce a partially burnt cotton material having an undesirable short fiber or brittle characteristic.

The present invention thus provides a control apparatus having temperature sensing transmitting and controlling means that adds a predetermined temperature and heat content change in the heated air that is being delivered to a lot of cotton entering a drying unit so that the moisture content of the cotton that leaves such a drying unit will be held uniform regardless of its quantity and/or the moisture content it contained before it entered the drying unit.

What is claimed is:

1. In an apparatus for drying seed cotton which comprises, a seed cotton drying tower, an inlet duct communicating with said drying tower, a cotton supply duct communicating with said inlet duct, means for introducing air into said inlet duct upstream of said supply duct, means for heating said air before introduction into said inlet duct, and outlet means for removing air and cotton from said drying tower, the improvement which comprises a control apparatus to vary the temperature of heated air flowing from said heating means into the seed cotton passing through said tower by way of said inlet duct in accordance with the quantity and the moisture content of said seed cotton flowing therethrough, said control apparatus being comprised of a first intermediate temperature responsive means having a first sensing means located within said inlet duct upstream of said cotton supply duct to sense the temperature of the heated air flowing from said air heating means into said inlet duct, said first responsive means being responsive to changes occurring in said temperature being sensed by said first sensing means to produce a first output signal whose magnitude is proportional to this temperature, a second intermediate temperature responsive means having a second and third sensing means respectively located within said inlet duct upstream of said supply duct and within said tower at substantially the mid-point portion thereof to jointly sense the difference between the temperature of said heated air flowing into said inlet duct and the temperature of the cotton passing through said portion located at substantially the mid-point of said tower, said second intermediate responsive means being operably responsive to changes in temperature being sensed by said second and third sensing means to produce a second output control signal that is proportional to the magnitude of the temperature difference that exists between said last two mentioned temperatures, said apparatus further comprising a control means for said heating means responsive to the magnitude of said first output control signal to maintain a predetermined inlet air temperature and reset by said second mentioned output control signal to increase said inlet air temperature in accordance with an increase in said temperature difference, and to decrease said inlet air temperature in accordance with a decrease in said temperature difference.

2. In an apparatus for drying seed cotton which comprises, a seed cotton drying tower, an inlet duct communicating with said drying tower, a cotton supply duct communicating with said inlet duct, means for introducing air into said inlet duct upstream of said supply duct, means for heating said air before introduction into said inlet duct, and outlet means for removing air and cotton from said drying tower, the improvement which comprises a first means for sensing the temperature of air upstream of said cotton inlet duct, control means for said heating means responsive to said first sensing means to maintain a predetermined temperature of said air, second means for sensing the temperature differential between air in said inlet duct upstream of said cotton inlet and air substantially at the mid-point of said tower, said control means being responsive to said temperature differential sensing means to reset the predetermined temperature of said air, increasing and decreasing said temperature in proportion with the respective increase and decrease of the temperature differential.

3. In an apparatus for drying fibrous bulk material which comprises, a fibrous bulk material drying tower, an inlet duct communicating with said drying tower, a fibrous bulk material supply duct communicating with said inlet duct, means for introducing air into said inlet duct upstream of said supply duct, means for heating said air before introduction into said inlet duct, and outlet means for removing air and fibrous bulk material from said drying tower, the improvement which comprises a first means for sensing the temperature of air upstream of said fibrous bulk material inlet duct, control means for said heating means responsive to said first sensing means to maintain a predetermined temperature of said air, second means for sensing the temperature differential between air in said inlet duct upstream of said fibrous bulk material inlet and air substantially at the mid-point of said tower, said control means being responsive to said temperature differential sensing means to reset the predetermined temperature of said air, increasing and decreasing said temperature in proportion with the respective increase and decrease of the temperature differential.

References Cited in the file of this patent

UNITED STATES PATENTS

| | | |
|---|---|---|
| 1,262,842 | Randolph | Apr. 16, 1918 |
| 1,449,115 | Heckel | Mar. 20, 1923 |
| 1,871,773 | Bennett | Aug. 16, 1932 |
| 2,040,328 | Olson | May 12, 1936 |
| 2,122,037 | Lissauer | June 28, 1938 |
| 2,311,853 | Moore | Feb. 23, 1943 |
| 2,328,974 | Guler | Sept. 7, 1943 |
| 2,391,195 | Ross et al. | Dec. 18, 1945 |
| 2,409,787 | O'Neal et al. | Oct. 22, 1946 |
| 2,423,540 | Wills | July 8, 1947 |
| 2,440,648 | Walter et al. | Apr. 27, 1948 |
| 2,518,582 | Vincent | Aug. 15, 1950 |
| 2,548,943 | Burdick | Apr. 17, 1951 |
| 2,629,939 | Bennett | Mar. 3, 1953 |